United States Patent [19]
Leon

[11] 3,968,886
[45] July 13, 1976

[54] STICKER EMPLACER FOR A LUMBER STACKER
[75] Inventor: Edward M. Leon, Fort Bragg, Calif.
[73] Assignee: Georgia-Pacific Corporation, Portland, Oreg.
[22] Filed: Jan. 29, 1975
[21] Appl. No.: 544,955

[52] U.S. Cl. ............................ 214/6 M; 214/6 F; 214/152
[51] Int. Cl.² .................................... B65G 57/26
[58] Field of Search .............. 214/6 M, 6 DK, 6 F, 214/6 H, 6 G, 152

[56] References Cited
UNITED STATES PATENTS

| | | | |
|---|---|---|---|
| 310,232 | 1/1885 | Smith | 214/6 H |
| 674,262 | 5/1901 | Duncan et al. | 214/6 H |
| 1,490,594 | 4/1924 | DeLateur | 214/6 H |
| 2,065,673 | 12/1936 | Fay | 214/6 H |
| 3,387,720 | 6/1968 | Wilkin | 214/6 M X |
| 3,823,834 | 7/1974 | Rysti | 214/6 DK |

Primary Examiner—L. J. Paperner
Attorney, Agent, or Firm—Owen, Wickersham & Erickson

[57] ABSTRACT

A sticker emplacer for a lumber stacker in which the stickers supported in a series of spaced-apart stacks are each unloaded from the bottom of their stack and translated against a sticker holder device which then clamps on it and holds it positively. When the lumber layer is in place each sticker holder positively lowers its sticker and emplaces it on the top of the layer of boards. Then the clamp is released so that the sticker remains on the boards, while the sticker holder is retracted upwardly and made ready for the next layer.

14 Claims, 14 Drawing Figures

STICKER EMPLACER FOR A LUMBER STACKER

BACKGROUND OF THE INVENTION

This invention relates to a sticker emplacer for a lumber stacker. The invention is particularly related to use with a lumber stacker of the type in which several boards from a single layer, as for example from a conveyor, are grouped and formed into a layer, and successive layers are stacked. The stickers serve to space the successive layers apart from each other, and they comprise narrow boards running laterally across each layer of boards except the top layer.

Lumber is often seasoned. Seasoning is best done by providing suitable stacks of the lumber with each layer of the stack comprising several boards, with the layers kept apart from each other so that air can pass between them. Conventionally and quite satisfactorily when done right, the layers are spaced apart by shorter and smaller boards known as stickers. For example, each layer of lumber may be several feet across and many feet long, depending upon the length of the lumber, and the stickers run transversely across them, typically being about 1 × 2 inches and sufficiently long to run across the width of each layer. The stickers of each layer run parallel to each other and are typically spaced several feet apart from each other, at some desired distance.

The stacking and the placing of the stickers was formerly done by hand, and care was always taken to locate the stickers substantially in vertical alignment. Hand labor, however, is expensive and slow, and it has been desired to do the stacking mechanically both to reduce the ardor and the time taken to form the stacks manually and to reduce the number of laborers doing these menial hand jobs.

As a result, several machinery manufacturers offer lumber stackers. These differ from each other in various ways, but the one thing they have in common is that they accept lumber from a suitable conveyor usually moving transverse of the longitudinal axis of the boards, form a single layer of the boards, and then by various means stack the layers. The stackers are mechanical, and it is, of course, desirable to have the stickers put in place mechanically. They can be placed by hand, but to do so is time-consuming and awkward and results in a loss of much of the efficiency of the stacker.

However, the emplacing of stickers between successive layers of lumber has not been satisfactory in some stacking machines heretofore available. For example, one stacker which is otherwise an excellent machine emplaces the stickers from a series of stacks of sticker boards, usually formed manually by placing a number of stickers into a column between a pair of guides. Then this machine has laterally removed the bottom sticker of each stack at an appropriate time, moved it to one side, and dropped it on top of the boards of the main layer. This gave an approximate emplacement but not an exact one, and the inexactitude has had serious consequences.

The serious consequences are that some of the boards being seasoned may be warped if the stickers are not satisfactorily aligned vertically. Thus, when the stickers are approximately 1 × 2 inches, an emplacement of one sticker from its adjacent sticker by more than one-half of the width of the sticker has the result that the weight of the board layers on top presses down and forces the layer of boards on which this out-of-place sticker rests to flex downwardly on one side of the line of stickers, while the same layer is forced upwardly on the other side. This can cause very serious warping, and warping causes trouble later when the material is planed, as it usually is, or when it is used without planing. The cost of board warpage resulting from misplaced stickers is not known, but it must be a considerable amount. Naturally, this problem has caused severe dissatisfaction with stackers that misplace the stickers, as has been the case heretofore.

With the intention of remedying this difficulty, some of these prior-art sticker emplacers have utilized a hydraulic clamp to engage one end of the dropped sticker and hold it against the lumber stack before the other end is dropped. However, the hydraulic clamp does not act until the end it is to engage has dropped and probably bounced somewhat—usually too late to do any good, and the other end still drops down loosely.

The unevenness of the lumber itself—for the lumber is rarely sawn into exact thicknesses and therefore the layers are of uneven thickness—and the unevenness in the size of the stickers themselves causes dislocation and trouble, as well as the tendency of the sticker to bounce when it is dropped. Even if the stickers are initially made carefully and uniformly, as they themselves become seasoned and dried, they shrink, and therefore when they are reused, they are not all the same size, even if originally made so. It would be too expensive to plane them off at this time. Thus, the vibration, the bouncing, the unevenness, and several other factors combine to cause dislocation of stickers that are dropped, even though it might be thought that the dropping could be sufficiently accurate and smooth so that they could be held in place by a suitable hydraulic clamp. Such attempts have heretofore proved to be unsatisfactory. Some improvements may be obtained, but the amount is insufficient to make up for the difficulties that remain.

Therefore, an important object of the present invention is to provide a sticker emplacer that will more accurately locate the stickers so that they can be in sufficiently accurate alignment not to cause warpage of the boards.

Another object of the invention is to provide a mechanically operated sticker emplacer which requires a minimum of hand labor, usually confined to placing the sticker boards in between the guides that form the stacks of stickers.

Another object of the invention is to provide a sticker emplacer that is adaptable to various types of lumber stackers and can operate with these existing and known types of lumber stackers, which are satisfactory except for their sticker emplacement devices.

Another object of the invention is to provide a sticker emplacer which locates the stickers positively as part of the sequence of the lumber stacker itself, being synchronized with it so that the operations dovetail and thereby enable attainment of the maximum efficiency of operation in the lumber stacker itself.

Other objects and advantages of the invention will appear from the following descriptions.

SUMMARY OF THE INVENTION

The present invention provides a sticker emplacer for a lumber stacker of the type in which several boards are grouped into a single layer and the layers are vertically stacked. The stickers are to space apart the successive layers by running laterally across each layer of boards except the uppermost one.

This invention provides a series of stacked stickers, and the bottom sticker of each stack is removed one at a time by a sticker translator which moves the bottom sticker of each stack of stickers laterally transverse to the longitudinal axis of the stickers. Several of these translators operate simultaneously. A sticker holder receives each translated bottom sticker, there preferably being one sticker holder for each translated sticker located to receive and engage the middle of that sticker. These holders are made to hold the sticker positively after such engagement. Each sticker holder is then moved down by suitable lowering means that positively forces each sticker holder down with its sticker in place and pushes the sticker on to the top of a layer of boards. Then release means releases the sticker holder means from the sticker, so that the sticker can remain on top of its layer of boards, and also cause the lowering means to retract upwardly and move the sticker holder back up to receive the next sticker.

Considering the invention in somewhat more detail, the sticker translators are supported by a main frame having a limit switch. One translator or the carriage therefor carries an actuator for the limit switch, which actuates the limit switch when the translator has moved its full stroke away from the sticker stack while carrying the bottom sticker. As said before, there is a plurality of these sticker translators and a plurality of sticker holders, one for each sticker of each layer, and preferably they are made to operate simultaneously. The sticker holders are each supported by the frame for vertical movement with respect to the frame, and each of them has a holding head provided with a shoulder that is so located as to be engaged by the middle of the sticker when that sticker is carried by the translator across its full stroke. At that point, the limit switch is engaged and soon thereafter each holder is actuated; a suitable clamp which is initially arranged to avoid obstructing the movement of the sticker moves into position to clamp the sticker against the shoulder.

The sticker is held firmly while the translator is caused to release the sticker and to move back to its original position. The sticker remains firmly held while the next layer of boards is moved into place on the stack of lumber and while the device which moves this layer of boards into place is retracted out of position. At that time a suitable synchronizing device (such as a cam mounted on a master cam shaft of the lumber stacker) actuates a pneumatic device, such as a cylinder and piston, to cause the holder to move downwardly toward and against the new layer of lumber and to push the sticker down on top of the new layer of lumber.

Once the sticker is in place on top of the lumber the cam, which has been rotating on the master cam shaft, has moved to such a position that very soon thereafter it acts to release its actuated devices. When this happens, the clamp is released, so that the sticker is left in place on the lumber layer, and that the holder is then moved up away from it without disturbing it. The holding head is carried upwardly until it reaches the original position, where it is again on the level to receive the next sticker. All this is done automatically.

After each layer is in place and the stickers are in place, the stack itself is lowered by a desired distance corresponding to the combined thickness of the board layer and the sticker layer, so that the sticker is always released at about the same level, so far as the holder is concerned; therefore, the pneumatic devices for moving the holder down can always move the same distance. However, the device compensates for variations in the thickness and thinness of the lumber and stickers.

There always is a positive emplacement, and the cycle is repeated as often as may be needed until the desired stack is made.

Further understanding of the invention and of additional advantages and objects thereof will appear from the detailed description which follows and from the drawings.

DESCRIPTION OF A PREFERRED EMBODIMENT

Figure 1:
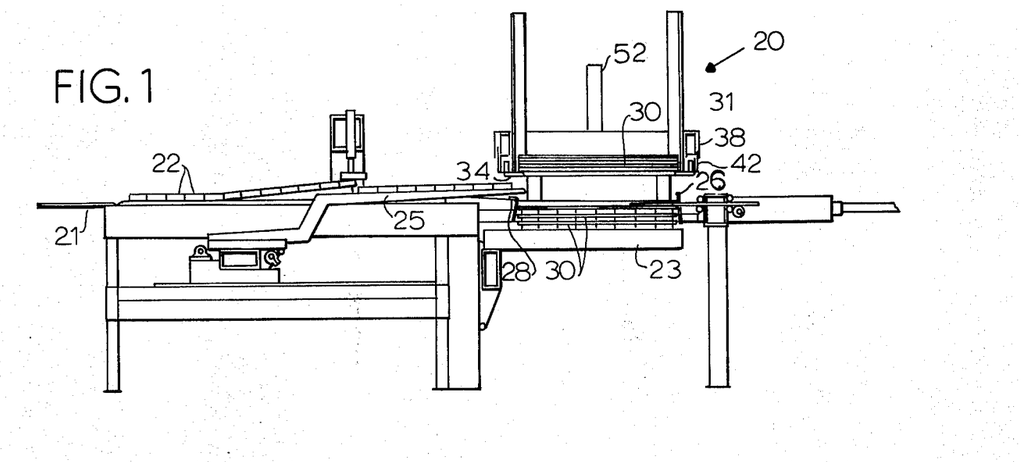
FIG. 1 is a simplified view in side elevation of a lumber stacking machine incorporating a sticker emplacer embodying the principles of the invention. The stacker is shown after a row of stickers are in place on the stack and just before another layer of lumber is to be introduced.
Figure 2:
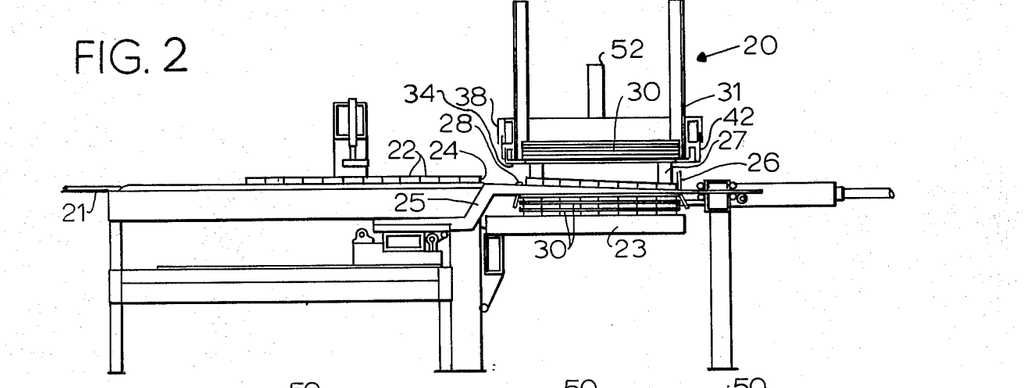
FIG. 2 is a view similar to FIG. 1 with a layer of lumber being added to the stack.

FIGS. 1 and 2 show a lumber stacker 20 having a conveyor 21, which in the drawings is moving from left to right to carry individual boards 22 to the stacker 20. The stacker 20 exemplifies a type of stacker with which the invention can be used and is shown by way of example. Other stackers operate on similar principles but in somewhat different manners and the invention is operable with them also. The stacker 20 includes a main frame and a vertically movable stack supporter. A stack supporter 23 moves down after each layer of the stack has been completed, moving down the amount needed for each layer to be set in place at the same level.

In the stacker 20 the boards 22 are moved by the conveyor 21 up against a stop 24, and then an arm-like member 25 is raised (as in FIG. 1) to lift one layer's width of boards, always more than one board but varying, depending upon the actual width of each board; thus it lifts up the number of boards 22 needed for one layer of the stack, then the arm member 25 moves forward (to the right, as in FIG. 2) to carry this layer in a raised position over the stacker base 23 and against a stop 26. A clamp member 27 is moved down on the board engaging the stop 26 and holds it in place, while the arm member 25 is retracted from beneath the boards; after moving a short distance, the last board of the layer engages another stop 28 which holds it in position and also holds the rest of the boards of the layer, so that all of the boards are released from the arm member 25 which the arm member 25 moves back and down to a position where it is ready to receive another group of boards which will form another layer. When the arm member 25 has returned, the conveyor 21 then moves more boards up to the stop 24.

Figure 3:
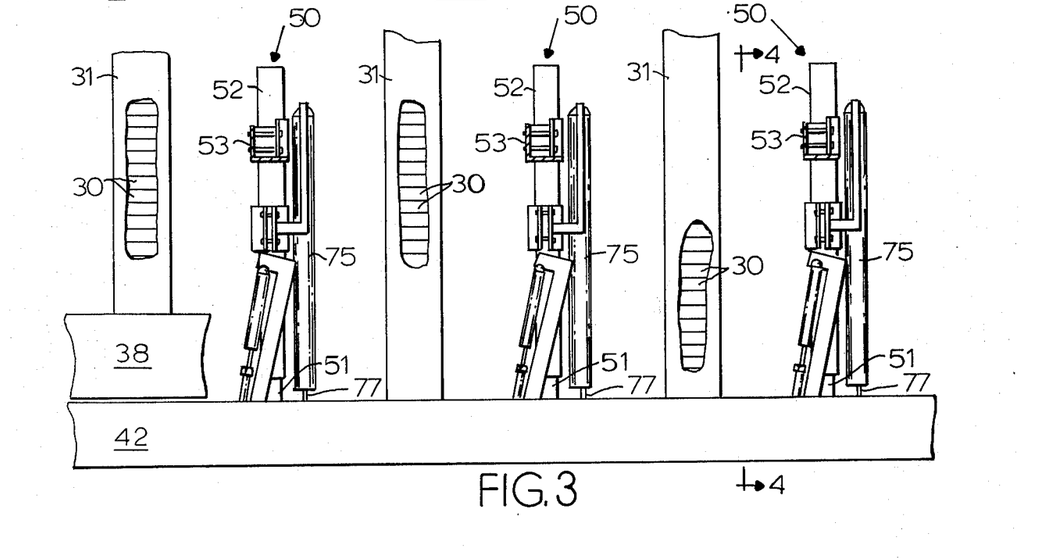
FIG. 3 is an enlarged fragmentary view in end elevation of the sticker emplacer assembly, with the view broken off at each side and parts broken away to disclose part of the stacks of stickers.
Figures 4, 5:
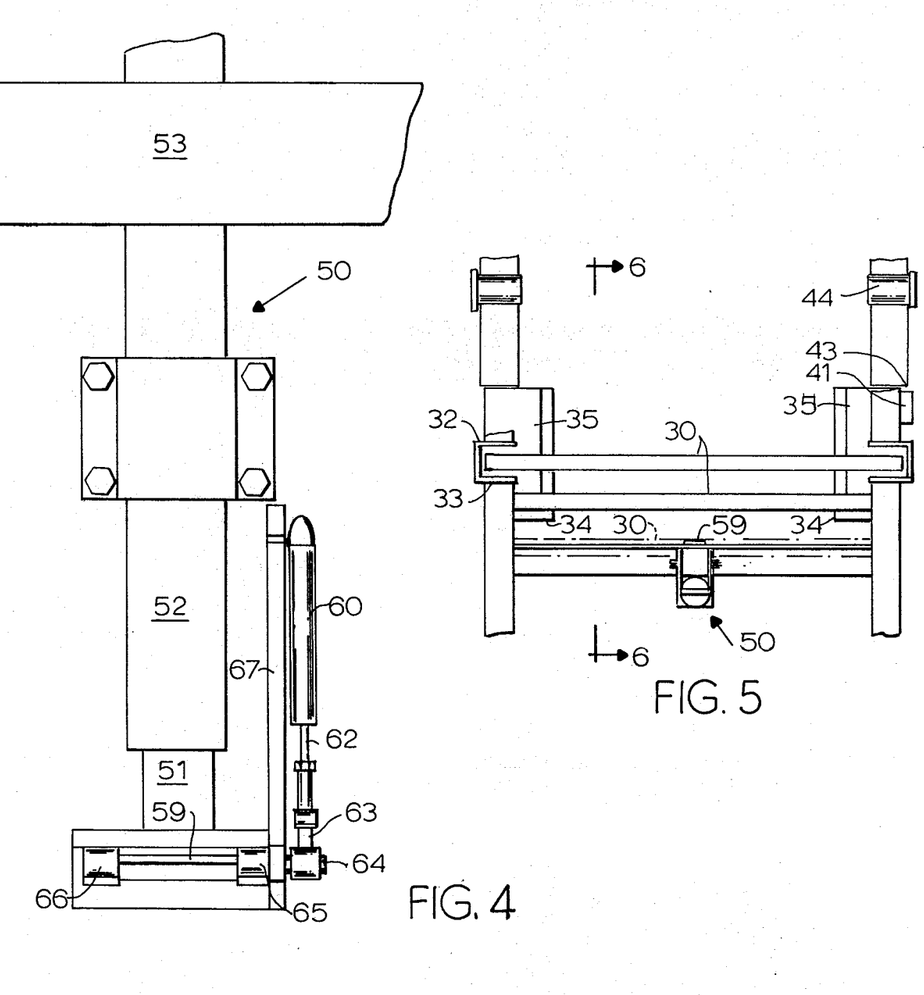
FIG. 4 is a view on a further enlarged scale in elevation of one stacker emplacer, looking in the direction of the arrow 4 in FIG. 3. A longitudinal support bar is broken off on each side to save room.
FIG. 5 is a top plan view of a portion of the stacker emplacer and the adjacent stack of stickers with one sticker shown removed from the stack and being moved horizontally toward the emplacer, where it eventually reaches the position shown in broken lines.
Figure 6:
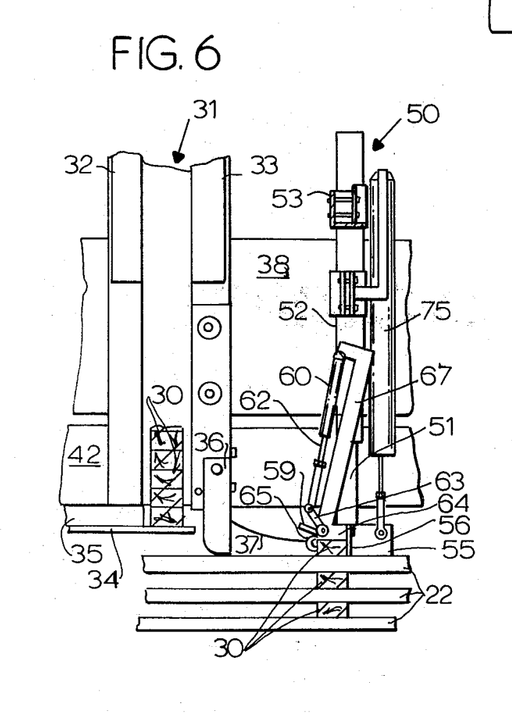
FIG. 6 is a view in side elevation and partly in section, taken along the line 6—6 in FIG. 5 but with the sticker being emplaced on the uppermost layer of a stack of lumber and the sticker transfer device fully retracted.

Each layer of boards 22 is placed on the stacker base 23 or on top of a series of spaced-apart stickers 30 that rest on a lower layer, depending on whether the layer is the first layer or a subsequent layer. Each time a layer of boards 22 is deposited, it is necessary to emplace some stickers 30 on top of that layer. For this purpose a series of sticker stacks 31 are provided, each having a pair of guide means 32 and 33 spaced apart sufficiently to accept loosely the width of the stickers 30, and the stickers 30 may be manually placed inbetween these guides 32 and 33 at the top, or a suitable machine for that may be provided. In any event, there are a series of stacks 31 of stickers 30, as shown in FIG. 3.

Figure 8:
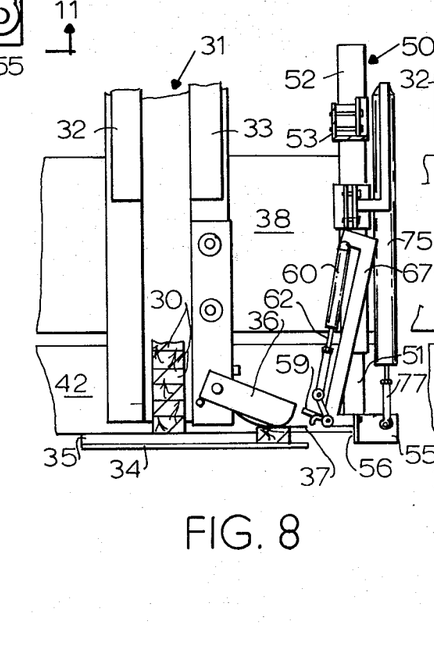
FIG. 8 is a view similar to FIG. 6 with the transfer device in about the position shown in solid lines in FIG. 5.
Figure 9:
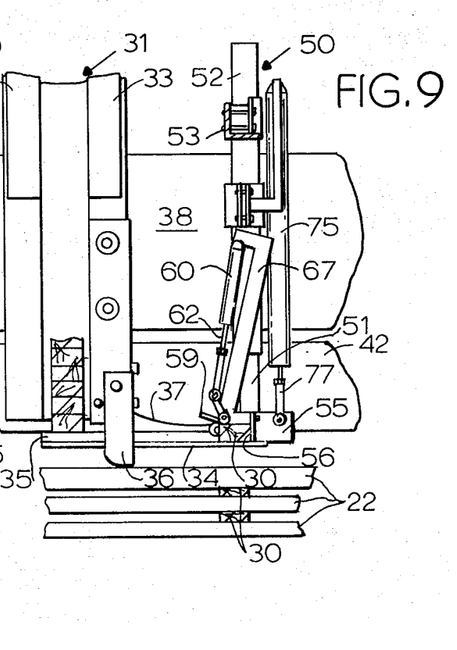
FIG. 9 is a view similar to FIG. 8 with the transfer device at the end of its stroke and the sticker clamped in place by the sticker emplacer.

The machine is provided with a device for removing the bottom sticker 30 from each stack 31 of stickers and for moving that bottom sticker 30 into a desired position. The movement is to be transverse to the longitudinal axis of the sticker 30 and may be carried out by the transfer device shown in FIGS. 5–9 and 13. As seen in these views at each end of the stack 31, there is a bottom plate 34 on which one end of the bottom sticker 30 rests in the position shown in FIGS. 7–9. Above that plate 34 is a metal block 35 rigidly secured to the bottom plate 34 and preferably a little thinner than the individual stickers 30. Thus, when the transfer device moves from left to right, as in the drawings, the blocks 35 move the lower sticker 30, still supported by the plates 34, out from under the stack 31, and the stack 31 of stickers 30 then drops down and rests on the block 35 during the transfer sequence. As shown, the transfer device causes the sticker 30 to swing a release member 36 temporarily out of the way (FIG. 8) and also to engage a leaf spring 37, which is flexed upwardly by the sticker 31.

Figure 7:
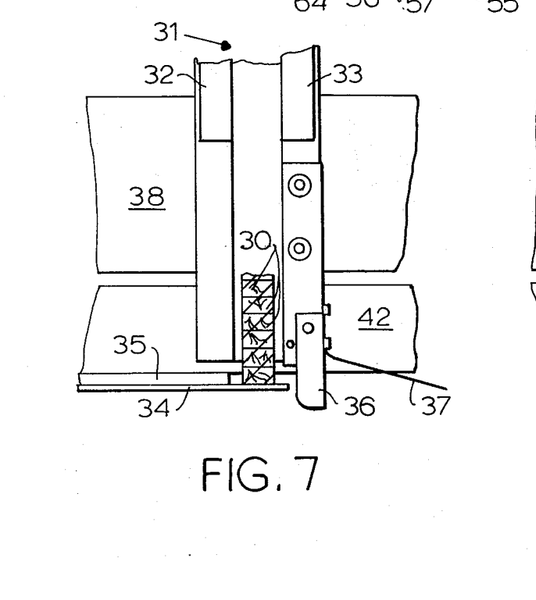
FIG. 7 is a view of the transfer device fully retracted prior to moving out the bottom sticker of a stack.

A stationary carriage support member 38 (see especially FIG. 13) has at least one limit switch 40 mounted thereon, with a switch arm 41. A movable carriage 42 for at least one (and preferably all) of the transfer devices involved has a limit-switch actuator 43 mounted on it to actuate the limit switch arm 41 at the time where the block 35 and plate 34 have moved the sticker 30 their full stroke away from the stack 31. The carriage support member 38 may provide pairs of rollers 44, 45 so that they move levelly. Once the actuator 43 has actuated the limit switch 41 there is a short time delay, which may be provided by a suitable time delay relay, and then the carriage 42 moves all the plates 34 and blocks 35 back to the left in FIGS. 6–9, releasing the sticker 30 that they have carried out, which is then (so far as this transfer device is concerned) ready to drop down. The transfer device moves back, and the blocks 35 pass beyond the stack 31, and then the stack 31 drops down some more so that the bottom sticker 30 falls in place on the plates 34, ready to be moved to the right again, as shown in FIG. 7, ready for the next sequence of operations.

Figure 10:
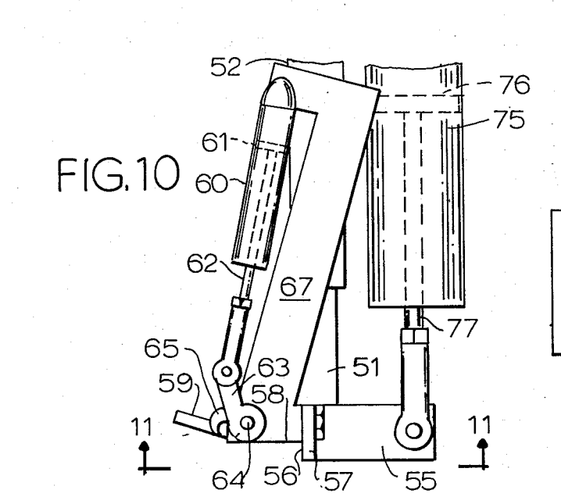
FIG. 10 is an enlarged view in side elevation of the bottom portion of the sticker emplacer.
Figures 11, 12:
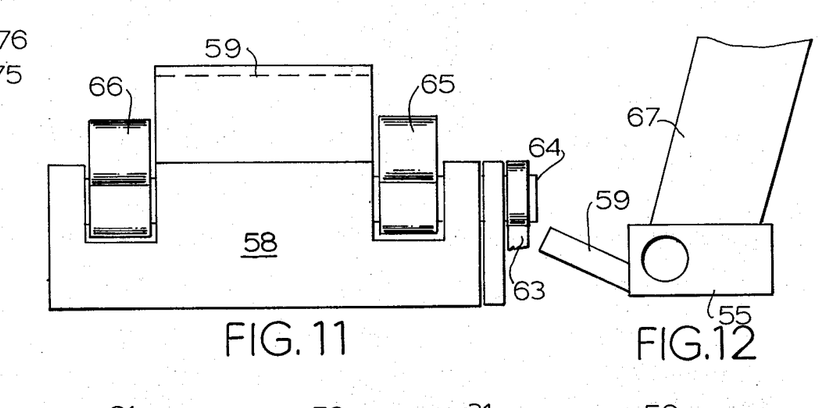
FIG. 11 is a bottom view looking up from the line 11—11 in FIG. 10, but considerably enlarged and showing only a portion thereof.
FIG. 12 is a view in side elevation of the central portion only of the clamp arrangement, shown on the scale of FIG. 11.
Figure 13:
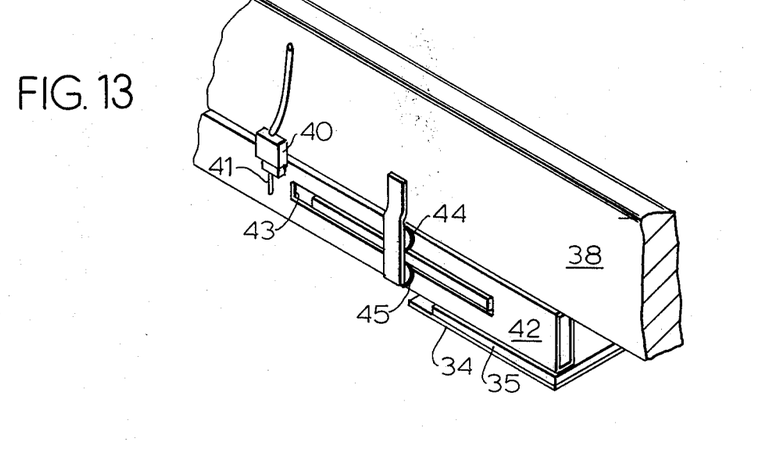
FIG. 13 is a fragmentary view in perspective of an actuating limit switch on the carriage of the sticker transfer device.

This is the time when a sticker emplacer 50 properly takes over. The sticker emplacer 50 includes a vertical column 51, preferably square, which can move vertically in a tubular member 52, also preferably square, and supported by a frame 53. The column 51 moves down from a normal ready position (FIGS. 8 and 9) to a sticker emplacing position (FIG. 7) and then back up into the original ready position. At the lower end of the vertical column 51 is a head member 55 which provides a shoulder 56. This shoulder 56 may be provided by two separate members bolted or welded together such a vertical member 57 and the horizontal member 58 (FIG. 10). Moreover, the horizontal member 58 may be provided with a guide or shear member 59 extending at an angle to it and capable of guiding the transferred sticker 30 in so that the upper surface of the sticker 30 will rest against the horizontal member 57 and so that various thicknesses of stickers can thereby be accommodated. A slight vertical movement is enabled for this purpose.

The sticker emplacer 50 includes a first pneumatic cylinder 60 having a piston 61 and a piston rod 62 (See FIG. 10). The piston rod 62 is pivotally secured to a crank 63 which is secured to a pivot shaft 64. To the shaft 64 is secured a pair of claw-like clamp members 65 and 66, one on each side of the horizontal member 58. In order to provide a good angle for operation, the upper end of the cylinder 60 is supported by an inclined arm 67 which is secured to the head 55.

Figure 14:
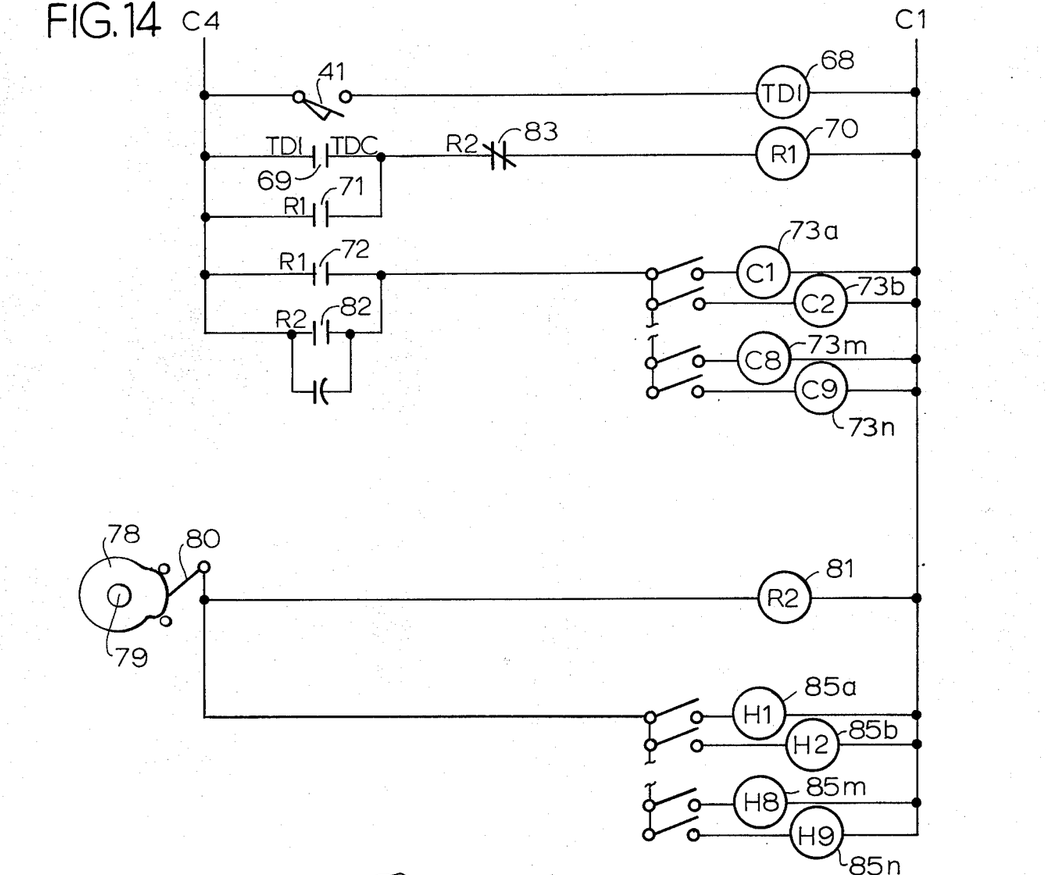
FIG. 14 is an electrical circuit diagram for the sticker transfer and emplacement device.

When the sticker 30 has been carried horizontally by the transfer block 35 and plate 34 for the full stroke of the carriage 42, the sticker 30 is located against the shoulder 56 formed by the vertical member 57 and the horizontal surface 58. The claw-like clamp members 65 and 66 are at this time retracted out of the way so that they do not engage the sticker 30, its upper surface at that time being even with or above the inclined guide member 59. The actuation of the limit switch 41 causes the actuation of a time delay relay 68, as shown in FIG. 14. The time delay relay 68 gives a desired time delay, which is usually about one second, simply enough time to make sure that the sticker 30 is in place against the shoulder 56 and that any vibration that might cause trouble has stopped. The time delay here is shorter than the time delay of the transfer device, so that the transfer block 35 and plates 34 are still holding the sticker 30 in position against the shoulder 56 for a short time after the time delay of the time delay relay 68 has passed. At the end of the delay of the relay 68, its contacts 69 close and this actuates another relay 70.

The relay 70 then closes its contacts 71 for self-holding operation and also closes contacts 72 which energize a series of solenoids 73a, 73b, . . . to 73n for a series of valves to send air into the upper end of the actuating cylinder 60 for each series of such sticker emplacers 50.

The air pressure on the upper end of each piston 61 causes its piston rod 62 to move downwardly and thereby swings the clamp members 65 and 66 into place where this clamps the sticker 30 and holds it positively against the shoulder 56. Each sticker 30 is thus clamped into position and positively held, and the release of the transfer device shortly thereafter does not therefore result in any actual dropping of the stickers 30 but simply a release transfer. The clamps 65 and 66 continue to hold the sticker 30 as the transfer device moves back to its original position, and shortly thereafter or possibly even during this time another layer of boards 22 is being moved by the stacker 20 into the machine against the stop 26, and the arm member 25 which moves it is being retracted, so that the boards are put in their position.

The sticker emplacer 50 also includes a vertically mounted power cylinder 75 provided with a piston 76 and a piston rod 77 which is secured to the head 55 and acts to carry the head 55 and the column 51 downwardly when the cylinder 75 is actuated. This actuation is provided by the arrival of a cam 78 mounted on a main camshaft 79 (see FIG. 14) of a master control for the stacker 20. Thus, the stacker 20 is provided with a series of cams mounted on this camshaft 79 which initiate various actions, including the initiation of the lifting and forward movement of the arm member 25 to move a layer of lumber against the stop 26 and the retraction of the arm member 25, and so on, including also the lowering of the head 55 at a proper time.

The actuation of the camshaft 79 and its cam are to ensure that the next layer of lumber is in place and the device that placed it there has been withdrawn before the cam 78 actuates a switch 80, which closes a relay 81. The relay 81 closes contacts 82 to hold the clamps in place and simultaneously opens contacts 83 to de-energize the relay 70. The relay 81 also energizes a series of solenoids 85a, 85b, . . . 85n that operate valves which send air into the upper end of each cylinder 75. This causes the downward movement of the piston 76 and piston rod 77 and with it the entire emplacer head 55 and the sticker 30. The stroke of the piston 76 is such that it ensures that the sticker will be carried down and actually forced into contact with the upper surface of the lumber layer. Variations related to the thickness of lumber are accommodated by the pneumatic device 75 itself acting as a shock absorber, so that the sticker 30 is carried down the farthest that need be but that not with force sufficient to break the sticker 30 or to cause any trouble.

Thus, each sticker 30 is located positively, and this is one of the most important features of the device because the positive location ensures that even though there is some jarring and movement of the lumber in the machine during the subsequent operation, yet that movement is not sufficient to displace the stickers 30 an amount where any trouble would be caused; therefore, vertical alignment of each series of stickers 30 is assured. The alignment may not be exact, it may be out a quarter of an inch or half an inch or an inch even, but it is always less than the width of the stickers 30, and this is assured by this positive emplacement.

The cam 79 is made to hold the switch 80 actuated until this positive emplacement has been completed; then its release will not cause it to get out of place. Thereupon the cam 79 moves past the switch 80 and the switch 80 is deactuated. The deactuation of the switch 80 causes the solenoids 85a to 85n to release the valves which actuate the cylinders 75 and to cause them to send air into the bottom end of the cylinders 75 and also, preferably simultaneously, causes the deactuation of the solenoids 73a to 73n, so that their valves send air into the bottom instead of the top of the cylinders 60. Since the holder cylinders 60 are much smaller than the cylinders 75, the cylinders 60 are actuated first and release the clamps 65, 66 quickly and get them out of the way before the upward movement of the emplacer head 55 actually begins. However, as soon as the sticker 30 is released, the upward movement of the emplacer head 55 begins. This upward movement continues for the stroke of the piston 76, until the emplacer head 55 is in its original position ready to receive the next sticker 30.

After the sticker 30 has been placed, the lumber stack supporter 23 moves down the desired distance to receive the next layer of lumber, and the operation continues in cycle until a stack is completed. Upon completion of the stack, a device preferably forming part of the stacker 20 itself is actuated so that when the top of the desired stack is reached the sticker transfer device will not operate. Therefore, even though the emplacers 50 may operate and move down on the top of the stack, they have no stickers to carry down with them and therefore no harm is done. Then the stack is shifted in the normal manner as done by the stacker 20, and the next stack begins.

It will be seen from the description and from everything in this specification that the basic key in this invention is the positive emplacement of the sticker 30 on top of each layer of the stack. No chances are taken by any dropping, and therefore no corrective actions are needed to correct the dropping. The positive grasping of the sticker 30, its positive lowering into place, and its release only after it is in place, ensure that whatever jarring may occur afterwards —so long as the stacker 20 is not malfunctioning—will be sufficient to cause any significant displacement of the stickers 30. This is what has solved the problem of providing a properly stacked stack of lumber in which each layer is carried by stickers 30 that are substantially in line, and therefore the stickers 30 do not force any warpage on the lumber, and consequently the lumber stacks are prepared for proper seasoning.

To those skilled in the art to which the invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A sticker emplacer for a lumber stacker of the type in which individual boards on a single layer are grouped into a series of layers of several boards each and said layers are stacked, successive layers being spaced apart by a series of spaced-apart stickers running laterally across each layer of boards, said stacker being provided with a series of stacked stickers providing a bottom end, said emplacer including in combination:

sticker transfer means for moving the bottom sticker of each stack of stickers laterally transverse to its longitudinal axis, sticker holder means for receiving each said bottom sticker from said sticker transfer means and holding it positively, holder lowering means for positively lowering each said sticker holder means with its sticker until the sticker contacts the top of a layer of boards, and release means for releasing said sticker holder means from said sticker following contact of the sticker with the layer of boards and for releasing said holder lowering means, so that said sticker holder means is retracted upwardly after releasing said sticker.

2. The sticker emplacer of claim 1 having release means for releasing said sticker from said transfer means after said sticker holder means has grasped said sticker and before said transfer means begins returning to said stack of stickers.

3. The sticker emplacer of claim 1 wherein said holder lowering means comprises pneumatic cylinder-piston means.

4. A sticker emplacer for a lumber stacker of the type in which individual boards on a single layer are grouped into a series of layers of several boards each and said layers are stacked, successive layers being spaced apart by a series of spaced-apart stickers running laterally across each layer of boards, said stacker being provided with a series of stacked stickers providing a bottom end, said emplacer including in combination:

sticker transfer means for moving the bottom sticker of each stack of stickers laterally transverse to its longitudinal axis, sticker holder means for receiving each said bottom sticker from said sticker transfer means and holding it positively, holder lowering means for positively lowering each said sticker holder means with its sticker to place it on the top of a layer of boards, and release means for releasing said sticker holder means from said sticker and for releasing said holder lowering means, so that said sticker holder means is retracted upwardly after releasing said sticker, said sticker holder means including a holding head provided with a shoulder located to be engaged by the sticker carried by the transfer means when said transfer means has moved its full stroke, said head having rotatable clamping means normally arranged to avoid obstructing movement of said sticker against said shoulder, and pneumatic cylinder-piston means for each said holding head actuated upon completion of the transfer from said transfer means to said holding head, for causing said clamping means to grasp said sticker and hold it against said shoulder.

5. The sticker emplacer means of claim 4 having a limit switch actuated by said sticker transfer means when said transfer means has moved its full stroke away from said sticker stack, carrying said bottom sticker therewith, said limit switch serving to actuate said pneumatic cylinder-piston means.

6. A sticker emplacer for a lumber stacker of the type in which individual boards on a single layer are grouped into a series of layers of several boards each and said layers are stacked, successive layers being spaced apart by a series of spaced-apart stickers running laterally across each layer of boards, said stacker being provided with a series of stacked stickers providing a bottom end, said emplacer including in combination:

sticker transfer means for engaging each sticker by its ends, removing the bottom sticker from each stack of stickers, and moving it laterally transverse to its longitudinal axis, sticker holder means for receiving the middle of each said transferred sticker from said sticker transfer means and holding it positively, holder lowering means for positively lowering each said sticker holder means with its sticker until the sticker comes positively into contact with the top of a layer of boards, and release means for releasing said sticker holder means from said sticker after the sticker has come into contact with the layer of boards and for releasing said holder lowering means so that said sticker holder means is upwardly retracted after releasing said sticker.

7. A sticker emplacer for a lumber stacker of the type wherein a series of individual boards are grouped into a series of layers, each layer having a plurality of boards, and said layers are stacked with successive layers spaced apart by a plurality of widely-spaced-apart stickers extending laterally transverse to the boards, so that each stack of lumber can be seasoned with air passing between the successive layers in between the stickers, and wherein the stickers are to be located in substantially vertically aligned columns, said stacker being provided with feeder means for retaining a plurality of stacks of said stickers in a location generally parallel to where they are to be emplaced, said emplacer including in combination:

a main frame supporting said feeder means, a plurality of sticker transfer means supported by said main frame for removing the bottom sticker from each stack thereof and moving it sideways, transverse from its longitudinal axis for a full stroke and then returning, a limit switch supported by said frame, a switch actuator supported by a said transfer means for actuating said limit switch when said transfer means has moved its full stroke away from said sticker stack, carrying the bottom sticker thereof, a plurality of sticker emplacers each supported by said frame for vertical movement with respect thereto and each having a holding head provided with a shoulder located to be engaged by the middle of a sticker carried by said transfer means when said transfer means has moved its full stroke, said head having clamping means normally arranged to avoid obstructing movement of said sticker against said shoulder, first power means for each said holding head actuated by actuation of said limit switch to cause said clamping means to grasp said sticker and hold it against said shoulder, second power means for moving said holding head vertically of said frame, and actuator means actuated by said sticker after a layer of boards is in place on said stacker and remaining actuated for a predetermined time and then being deactuated, said actuator means upon actuation causing said second power means to move said holding head vertically downwardly, so that each sticker is positively carried down and positively emplaced upon a layer of boards, deactuation of said actuator means causing said first power means to release said clamping means from said sticker and also causing said second power means to raise said holding head to its original position for reception of another sticker, thereby leaving the emplaced stickers in place on said layer of boards in a positively located position.

8. The sticker emplacer of claim 7 wherein said transfer means engage said bottom sticker adjacent its two ends.

9. The sticker emplacer of claim 7 wherein said limit switch actuates time delay relay means which, after a short time interval, actuates said first power means.

10. the sticker emplacer of claim 7 wherein said stacker has
a master camshaft, and
a sticker emplacer cam on said camshaft for actuating said actuator means.

11. A sticker emplacer for a lumber stacker of the type wherein a series of individual boards are grouped into a series of layers, each layer having a plurality of boards, and said layers are stacked with successive layers spaced apart by a plurality of widely-spaced-apart stickers extending laterally transverse to the boards, so that each stack of lumber can be seasoned with air passing between the successive layers in between the stickers, and wherein the groups of stickers are to be located in proper vertical alignment with each other, said stacker being provided with feeder means for retaining a plurality of stacks of said stickers in a location generally parallel to where they are to be emplaced, said lumber stacker having a master camshaft for timing its various stages of operation, said emplacer including in combination:
a main frame supporting said feeder means
a plurality of sticker transfer means supported by said main frame and each having a stationary guide and support portion and movable means for moving from an initial position and removing the bottom sticker from each stack thereof and, holding it adjacent its ends, moving it sideways, transverse from its longitudinal axis for a full stroke and then returning to said initial position,
means for moving said movable means simultaneously,
a limit switch supported by one said guide and support portion,
a switch actuator supported by a said movable means for actuating said limit switch when said movable means has moved its full stroke away from said sticker stack, carrying the bottom sticker thereof,
a plurality of sticker emplacers each supported by said frame for vertical movement with respect thereto and each having a holding head provided with a shoulder located to be engaged by the middle of a said sticker carried by said movable means when said movable means has moved its full stroke and having clamping means normally arranged to avoid obstructing movement of said sticker against said shoulder,
first pneumatic cylinder-piston means for each said holding head actuated by actuation of said limit switch to cause said clamping means to grasp a said sticker and hold it against said shoulder without dropping it,
release means for releasing said sticker from said movable means after said clamping means has grasped said sticker and before said movable means begins returning to its initial position adjacent said sticker stack,
second pneumatic cylinder-piston means for moving said holding head vertically of said frame,
a sticker-emplacer cam on said camshaft having an actuating portion,
actuator means actuated by said actuator portion after a layer of boards is in place on said stacker and remaining actuated for a predetermined time and then being deactuated by said cam, said actuator means upon actuation causing said second pneumatic cylinder-piston means to move said holding head vertically downwardly, so that each sticker is positively carried down and positively emplaced upon a layer of boards,
deactuation of said actuator means causing said first pneumatic cylinder-piston means to release said clamping means from said sticker and also causing said second pneumatic cylinder-piston means to raise said holding head to its original position for reception of another sticker, thereby leaving the emplaced stickers in place on said layer of boards in a positively located position.

12. A method for emplacing stickers as part of a lumber stacking process, in which individual boards on a single layer are grouped into a series of layers of several boards each and said layers are stacked, successive layers being spaced apart by a series of spaced-apart stickers running laterally across each layer of boards, comprising the successive steps of:
moving the bottom sticker of each of several stacks of stickers laterally transverse to its longitudinal axis,
locating each said bottom sticker at a predetermined position and holding it positively,
positively lowering each said sticker into contact with the top of a layer of boards, and
with said sticker in contact with the layer of boards, releasing it there.

13. The method of claim 12 in which all said bottom stickers are dealt with simultaneously in each step.

14. A method for emplacing stickers as part of a lumber stacking operation of the type in which individual boards on a single layer are grouped into a series of layers of several boards each and said layers are stacked, successive layers being spaced apart by a series of spaced-apart stickers running laterally across each layer of boards, comprising the steps of:
forming a series of stacks of stickers, each having a bottom end, each said stack being above and laterally removed from its desired position on a layer of boards, and the stickers of said stack being oriented transversely to the lengths of the layer of boards,
engaging each bottom sticker by its ends, removing the bottom sticker from each stack of stickers, and moving it laterally transverse to its longitudinal axis,
engaging and holding positively the middle of each said transferred sticker,
positively lowering each said sticker into contact with the top of a layer of boards, and
with said sticker in contact with the layer of boards, releasing said sticker while retracting upwardly the apparatus that held it positively and lowered it positively.

\* \* \* \* \*

UNITED STATES PATENT AND TRADEMARK OFFICE
CERTIFICATE OF CORRECTION

PATENT NO. : 3,968,886
DATED : July 13, 1976
INVENTOR(S) : Edward M. Leon

It is certified that error appears in the above-identified patent and that said Letters Patent are hereby corrected as shown below:

Column 6, line 29, "together such" should read --together such as--.

Column 7, line 37, "its cam are" should read --its cams are--.

Column 8, line 45, "will be sufficient" should read --will be insufficient--.

Column 8, line 53, "the invention" should read --this invention--.

Column 9, line 47, "carried by the transfer" should read --carried by said transfer--.

Column 10, line 61, "actuated by said sticker" should read --actuated by said stacker--.

Column 11, line 9, "means engage" should read --means engages--.

Signed and Sealed this

Twelfth Day of October 1976

[SEAL]

*Attest:*

RUTH C. MASON
*Attesting Officer*

C. MARSHALL DANN
*Commissioner of Patents and Trademarks*